United States Patent
Sasanuma et al.

(10) Patent No.: US 8,647,177 B2
(45) Date of Patent: Feb. 11, 2014

(54) GRINDER FOR SAW CHAIN

(75) Inventors: Yasunori Sasanuma, Soja (JP);
Kazunaka Saeki, Kurashiki (JP);
Tatsusaburo Sasada, Kurashiki (JP);
Hitoshi Itano, Soja (JP)

(73) Assignee: SK Co., Ltd., Okayama (JP)

( * ) Notice: Subject to any disclaimer, the term of this patent is extended or adjusted under 35 U.S.C. 154(b) by 513 days.

(21) Appl. No.: 13/000,994

(22) PCT Filed: Jun. 23, 2008

(86) PCT No.: PCT/JP2008/061795
§ 371 (c)(1),
(2), (4) Date: Dec. 22, 2010

(87) PCT Pub. No.: WO2009/157091
PCT Pub. Date: Dec. 30, 2009

(65) Prior Publication Data
US 2011/0120268 A1 May 26, 2011

(51) Int. Cl.
*B24B 3/36* (2006.01)
(52) U.S. Cl.
USPC .......................................................... 451/349
(58) Field of Classification Search
USPC ................ 451/45, 349, 438, 439, 358; 76/82
See application file for complete search history.

(56) References Cited

U.S. PATENT DOCUMENTS

| | | | | |
|---|---|---|---|---|
| 3,172,306 A | * | 3/1965 | Kephart, Jr. | 76/36 |
| 3,364,796 A | * | 1/1968 | Steibel | 76/40 |
| 4,173,908 A | * | 11/1979 | Aksamit | 76/80.5 |
| 7,909,681 B2 | * | 3/2011 | Nishigaki | 451/419 |

FOREIGN PATENT DOCUMENTS

| | | |
|---|---|---|
| JP | S55-018381 A | 2/1980 |
| JP | S55-89519 A | 6/1980 |
| JP | H10-128619 A | 5/1998 |
| JP | 2005-288676 A | 10/2005 |

\* cited by examiner

*Primary Examiner* — Robert Rose
(74) *Attorney, Agent, or Firm* — DLA Piper LLP (US)

(57) ABSTRACT

A grinder capable of correctly grinding a cutting blade with a simple operation being provided. Two channels which can be replaced from above on a guide bar in alignment with right and left blades of a saw chain are provided in a base body, a grinding stone shaft is provided on the base separated from the channels by the predetermined same distance while inclined by a predetermined angle relative to a parallel direction to the channels, and a disk grinding stone attached to the grinding stone shaft grinds the side blade and the upper blade of the saw chain simultaneously. The grinder is characterized in that the outer wall of the channel is shorter than the inner wall and contact part contacting the guide bar are formed at lower ends of both walls to make the base horizontal.

4 Claims, 13 Drawing Sheets

GRINDER FOR SAW CHAIN

TECHNICAL FIELD

The present invention relates to a grinder for a saw chain, with which the cutting blades of a saw chain that is the cutting tool on a chainsaw can be ground while being mounted to the chainsaw.

BACKGROUND ART

Saw chains wear down as they are used, and they must be ground to restore their cutting edge. The grinding of a saw chain generally involves grinding one blade at a time with a tool such as a rat-tail file with the saw chain being mounted to the chainsaw. However, this is done manually, and good grinding requires considerable skill. Also, it would occur that as grinding proceeds, the shape of the various blades becomes uneven, so that eventually the chain becomes so unbalanced and it cannot cut any longer.

In one grinder proposed in view of the above facts, a file is attached to an electric tool and fixed relatively with respect to the saw chain, so that the grinding is performed thereby mechanically. In one of this type of grinder, the saw chain is removed from the chainsaw main unit (hereinafter called "main unit"), set on a grinding stand or the like, and then grinding is performed in this state; and in another type, the saw chain is ground while being mounted on the main unit. The former type affords a more accurate grind; however, it entails extra work of removing and reattaching the chain, and the grinding cannot be performed on-site. The latter, on the other hand, is more convenient; however, it takes time to attach the grinder, and set-up can be difficult.

Japanese Patent Application Laid-Open No. 2005-288676 discloses the latter type of grinder, and it describes that the grinder can be set up merely by inserting a guide body equipped with an electric motor from above the saw chain. However, since the spacing between the ribs and pressing plates that sandwich the guide bar of the saw chain from the left and right is set so that extra space is assured with respect to the thickness of the guide bar, the pressing plate must be pushed in the direction of grinding while being kept upright by being constantly pressed against the guide bar, which makes operation difficult. The grindstone used in this prior art example is a cylindrical grindstone, and such a grindstone wears down quickly; and since the working radius is small, the grinding capability is inferior. Furthermore, in this prior art example, the cylindrical grindstone is rotated at high speed; however, if the grinding speed is too high, grinding heat may make it impossible to keep the blade face at the optimal hardness. In contrast to this example, the grinder disclosed in Japanese Patent Application Laid-Open No. H10-128619 makes use of a disk-shape grindstone. However, since the grinder is supported by support legs, etc., the apparatus becomes bulkier. In addition, in this example, since the setting of the grindstone into the proper position is accomplished by turning a knob provided on the support legs, high skill is required, and also it takes more time.

DISCLOSURE OF INVENTION

The present invention is to solve these problems, and it allows the relative position of the cutting blades and a disk-shape grindstone to be determined by a simple operation of merely fitting the grinder on a guide bar from above while the chain is being mounted on the chainsaw main unit. When grinding is done, the disk-shape grindstone is merely pressed lightly against the cutting blades.

In the light of the above-described problems, the present invention provides a saw chain grinder as defined in claim 1, in which a base body is provided with two channels which are interchangeably, depending on a left or right blade of a saw, fitted on a guide bar of the saw from above; a grindstone shaft is provided in the base body at a specific angle of inclination in a direction parallel to the channels and spaced equidistantly from the channels; and the side blade and upper blade of the saw chain are ground simultaneously by a disk-shape grindstone attached to the grindstone shaft, and wherein the outside walls of the channels are formed shorter than the inside walls, and contact parts that come into contact with the guide bar are formed at the lower ends of both walls so that the base body can be set horizontally. In this structure described above, by merely fitting the channel on the guide bar from above until the top of the saw chain comes into contact with the channel, contact parts formed on both walls of the channel are in touch with both side faces of the guide bar, so that the grindstone shaft is set in a state in which it does not lean to the left or right (in which the base body is set horizontal). Thus, set-up of the grinder is simple and quickly done.

For the above-described grinder, the present invention also provides a means, as described in claim 2, in which the outside walls receive the saw chain on their wall faces. Accordingly, there is no need to provide contact parts to the outside walls of the channels, which is advantageous in terms of lowering the cost.

For the above-described grinder, the present invention further provides a means, as described in claim 3, in which two channels are provided crossing in an X shape, and the grindstone shaft is provided in the middle thereof; and a means, as described in claim 4, in which one channel is provided at a specific distance away from the grindstone shaft, two shaft receiving parts for receiving the grindstone shaft at mutually opposite inclination angles are provided on the grindstone shaft-side side faces of the channels, so that grindstone shafts are interchangeably set in the shaft receiving parts; and a means in which one channel is provided at a specific distance away from the grindstone shaft, a shaft receiving part that receives therein the grindstone shaft is provided on a side face of the channel which is on the grindstone shaft-side, and this attachment plate is tiltable at various inclination angles. These means allow the overall size to be more compact and the structure to be simpler.

Furthermore, for the above-described grinder, the present invention further provides a means wherein the contact parts of the inside walls is movable toward and away from the guide bar. This means allows the grinder to be usable in chain saws having different thickness in the guide bars.

In addition, the present invention provides a grinder in which a base body is provided with two channels (in this embodiment) which are interchangeably, depending on a left or right blade of a saw, fitted on a guide bar of the saw from above; a grindstone shaft is provided in the base body at a specific angle of inclination in a direction parallel to the channels and spaced equidistantly from the channels; and the side blade and upper blade of the saw chain are ground simultaneously by a disk-shape grindstone attached to the grindstone shaft; and in this grinder the spacing between the inside and outside walls of the channels is formed greater than the width of the saw chain, so that the base body can be set horizontally by hand. This provides a simpler structure. In addition, for this grinder, the present invention further provides a means wherein one channel is provided, two shaft receiving parts that receive grindstone shafts are provided at the same specific distance away from the channel on both sides of the channel, and the grindstone shaft is interchangeably provided in the two shaft receiving parts. This structure allows the overall size to be more compact.

BEST MODE FOR CARRYING OUT THE INVENTION

Figure 13:
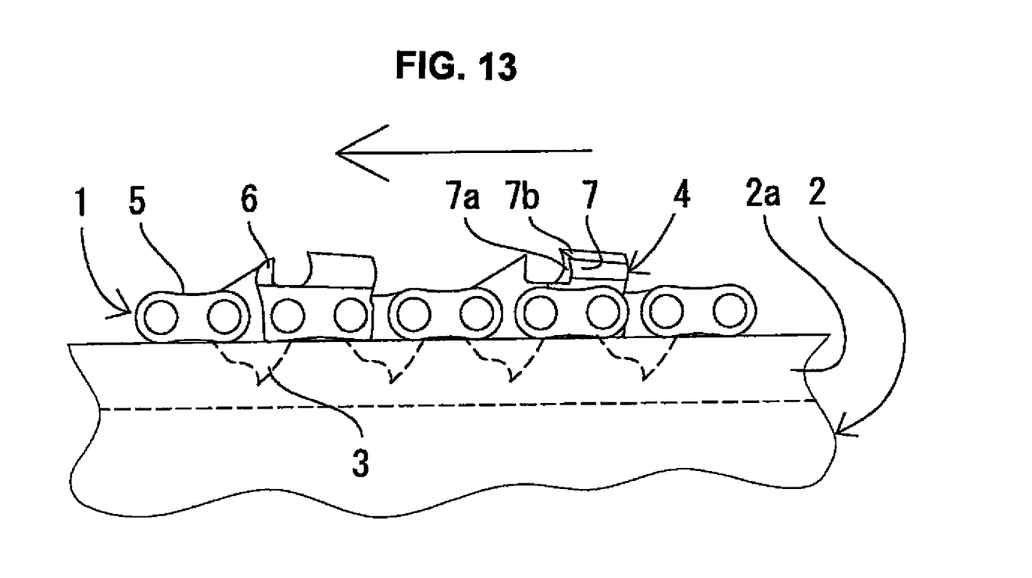
FIG. 13 is a partial side view of a saw chain.
Figure 14:
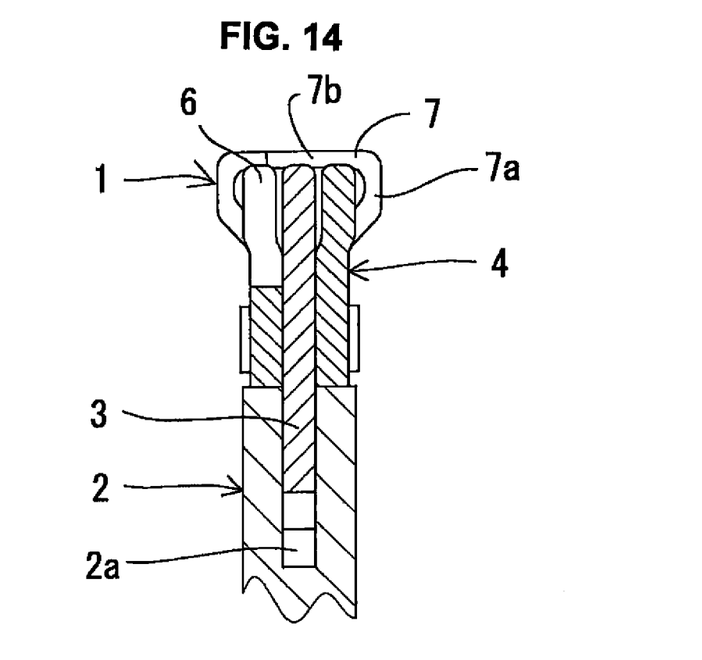
FIG. 14 is a partially cut-away front view of a saw chain.

Embodiments of the present invention will now be described through reference to the drawings. First, a saw chain will be described. FIG. 13 is a side view of a saw chain, and FIG. 14 is a front cross sectional view thereof. A saw chain 1 rotates while sliding around the peripheral edge of a guide bar 2 of a chain saw, and it comprises cutters 4 and tie straps 5 that are continuously linked on the left and right sides of drive links 3 which are positioned front and rear of the cutters 4 and tie straps 5 so sandwich them. Each cutter 4 includes a depth gauge 6 and a cutting blade 7, and the cutting blade 7 consists of a side blade 7a and an upper blade 7b. The side blade 7a and upper blade 7b are formed in a squared-off shape or a rounded shape when viewed in the direction of travel (this direction shall be a front view direction).

To provide a kerf set, the left and right side blades 7a extend out sideways, and the width of the side blades 7a is set to be slightly greater than the width of the guide bar 2. For the cutting blades 7, those attached to the right face of the drive link 3 and having the upper blade 7b extending to the left when viewed in the direction of travel (the front view direction) shall be called a left cutter 4, and those attached to the left face of the drive link 3 and having the upper blade 7 extending to the right shall be called the right cutter 4 (hereinafter, when reference is made to the left or right, it shall be based on this view of the cutter). The drive links 3 engage with a sprocket (not shown) fitted to the output shaft of an engine of the chain saw; and they fit into the groove 2a formed around the peripheral face of the guide bar 2 and rotate around the peripheral edge of the guide bar 2.

Figure 1:
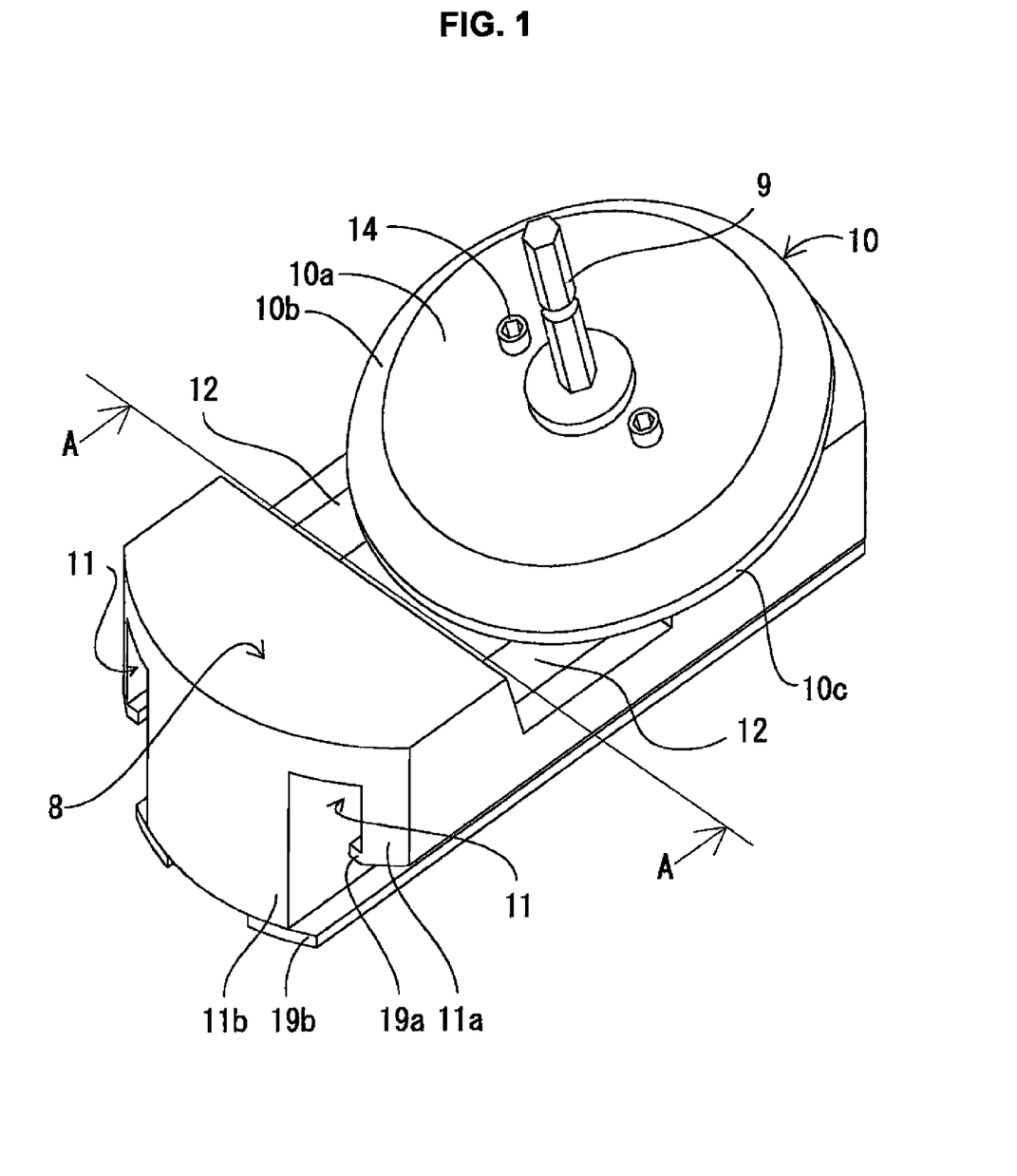
FIG. 1 is a perspective view of a grinder.
Figure 2:
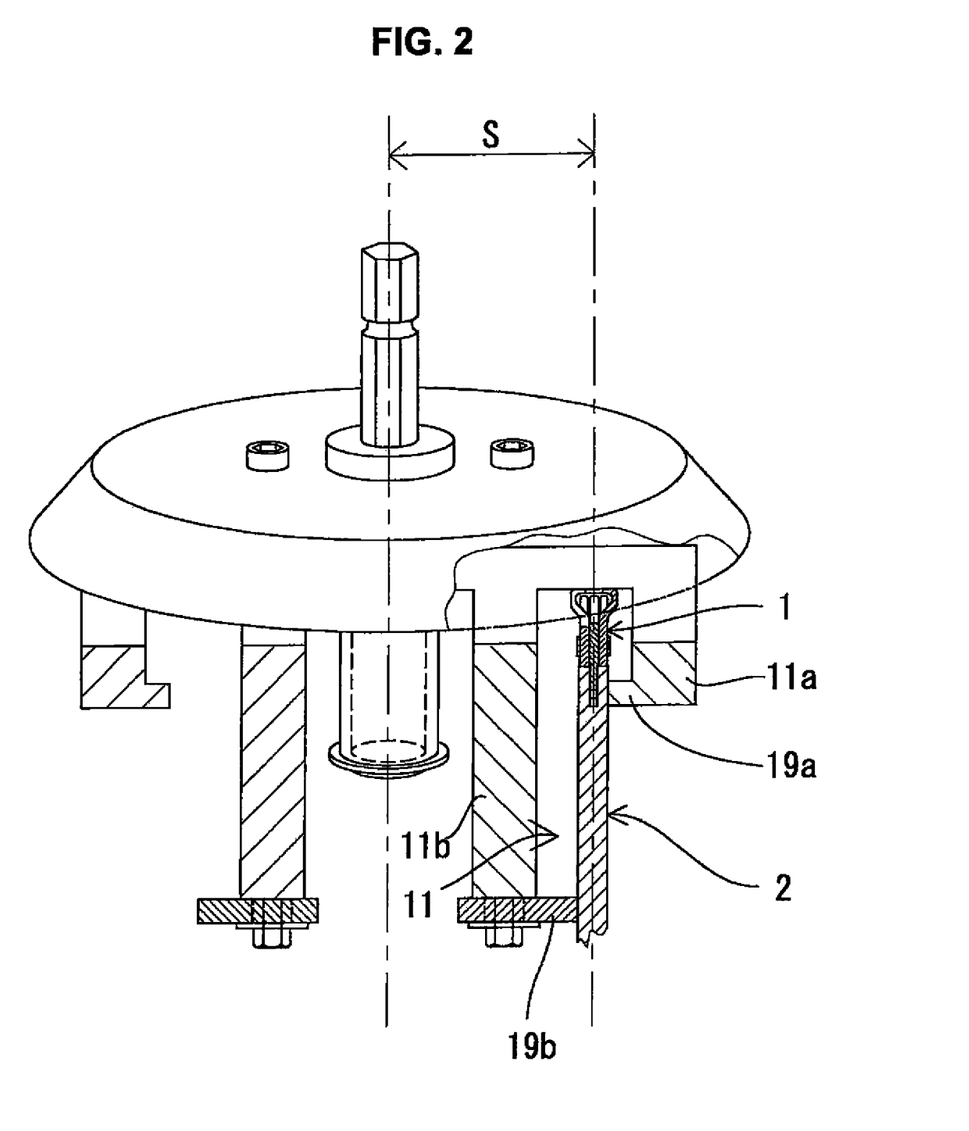
FIG. 2 is a cross sectional view taken along the line A-A in FIG. 1.
Figure 10:
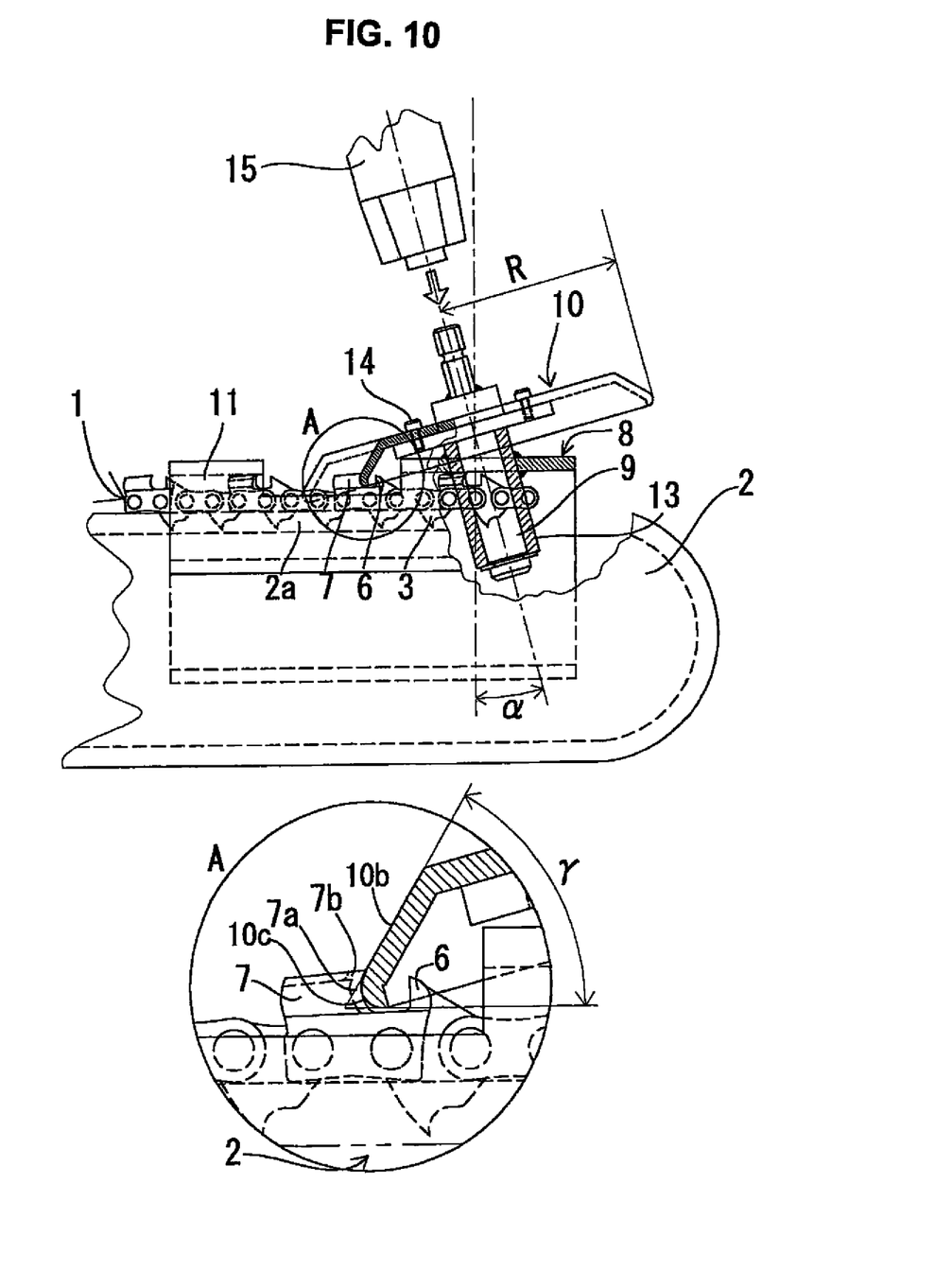
FIG. 10 provides partially cut-away side view of the grinder, showing the grinding state.
Figure 11:
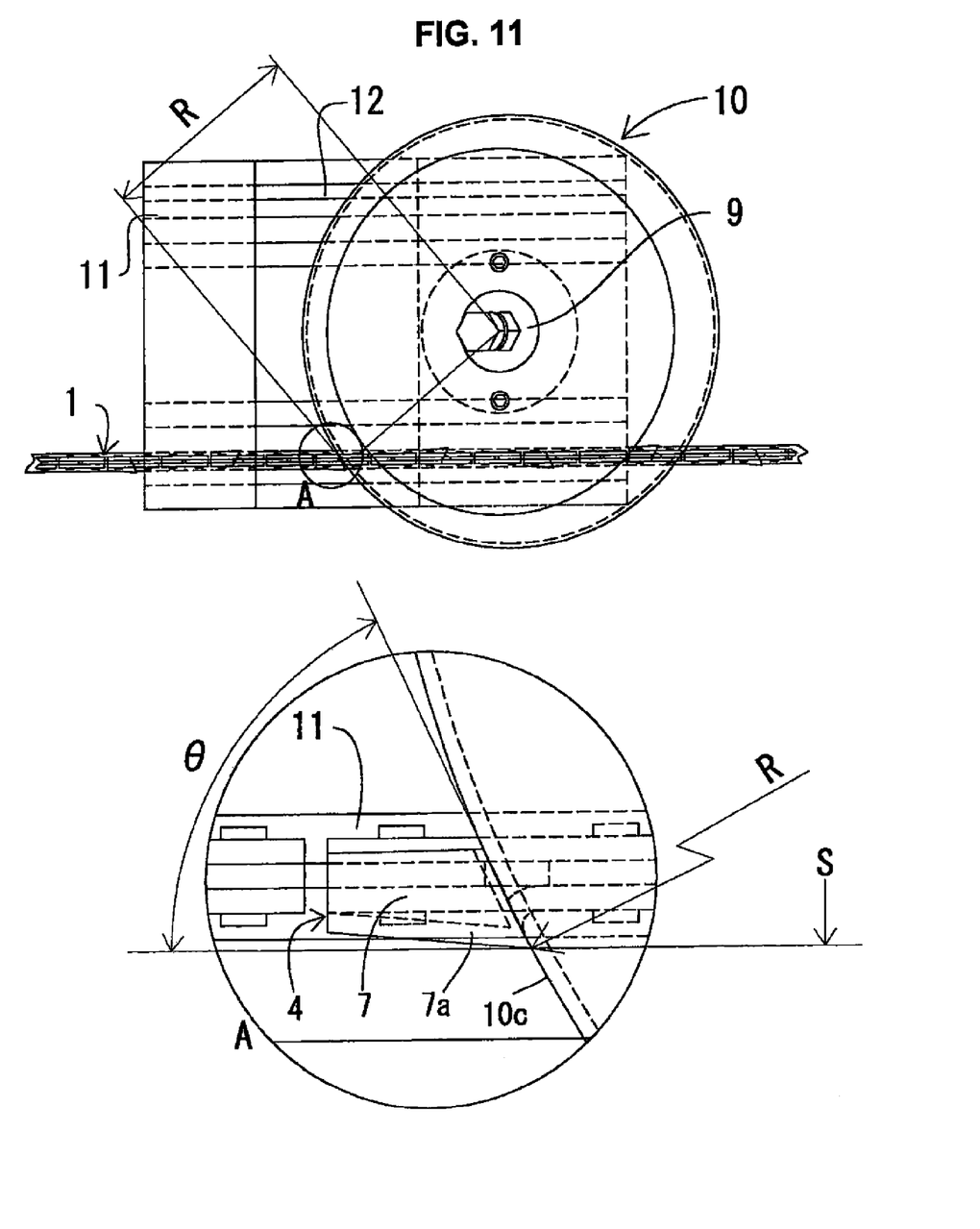
FIG. 11 provides partial top views of the grinder, showing the grinding state.

FIG. 1 is a perspective view of a grinder, illustrating an example of the present invention; and FIG. 2 is a cross sectional view taken along the line A-A in FIG. 1. FIG. 10 is a partially cut-away side view, and FIG. 11 is a partial top view. This grinder comprises, among others, a base body 8 serving as the main body, a grindstone shaft 9 provided in the base body 8, and a disk-shape grindstone 10 attached to the grindstone shaft 9. In the base body 8 in this example, two parallel channels 11, which are in an inverted U shape and fitted on the guide bar 2 from above are formed in the rear face. A cutout 12 made by cutting out the upper part of each of the channels 11 is formed in the longitudinal middle part of the base body 8. Each of the channels 11 comprises an outside wall 11a and an inside wall 11b having the same shape on the left and right. Each channel 11 is wide enough to receive the guide bar 2 therein, and the outside wall 11a is formed shorter than the inside wall 11b. The lower ends of the outside wall 11a and of the inside wall 11b are provided with contact parts 19a and 19b that protrude in the direction of the guide bar 2 so that they come into contact with the two side faces of the guide bar 2 when the guide bar 2 is inserted.

A shaft receiving part 13 is formed in the base body 8, and the grindstone shaft 9 is rotatably housed in this shaft receiving part 13. The shaft receiving part 13 in this example is made of a material (such as resins) that has no problems in terms of strength, lubrication, heat resistance, or the like; and the grindstone shaft 9 is inserted directly into this shaft receiving part 13. A bearing or the like can be provided in the shaft receiving part. Furthermore, in this example, the shaft receiving part 13 (and therefore the grindstone shaft 9 therein as well) is inclined by an inclination angle α in the opposite direction from the direction in which the saw chain 1 travels, and it is offset by the same amount S from both of the channels 11. The disk-shape grindstone 10 is secured by bolts 14 or the like to a flat plate provided on the grindstone shaft 9 sticking out of the base body 8. The disk-shape grindstone 10 in this example is cup-shaped, and it comprises a disk portion 10a that is placed over the grindstone shaft 9 and into which the bolts 14 are inserted, an inclined portion 10b that is inclined downward from the outer end of the disk portion 10a, and a peripheral end portion 10c that is formed at the distal end of the inclined portion 10b and acts on the saw chain 1. The inclination of the grindstone shaft 9, the offset S from the channels 11, the outside diameter and peripheral end shape of the cup-shape grindstone 10 are in a specific relation, which will be described below.

To grind the saw chain 1 with the grinder constituted as described above, a selection is first made for one of the channels 11 to grind the cutters 4 facing either to the left or right (for the right cutters 4, the channel 11 on the left side is chosen to use). Then, the channel 11 is fitted on the guide bar 2 from above. This fitting on is made until the top of the saw chain 1 comes into contact with the top face (that is, the bottom) of the channel 11. Since the lengths of the outside wall 11a and inside wall 11b of the channel 11 are different, the insertion of the guide bar into the channel can be done easily. Also since the center of gravity of the base body 8 is farther to the inside thereof than the inside wall 11b, the contact parts 19a and 19b come into contact with both faces of the guide bar 2 by momentum, and the base body 8 is set horizontally, and the grindstone shaft 9 is positioned vertically. Once this state is established, the peripheral end portion 10c of the disk-shape grindstone 10 is in the cutout 12 and is set in the proper grinding state with respect to the side blade 7a and upper blade 7b of the cutter 4. For this to happen, it is important that the base body 8 is set horizontally and the grindstone shaft 9 is set vertically, and to make this possible, the contact parts 19a and 19b are provided at the lower ends of the outside wall 11a and inside wall 11b of the channel 11. Both of the contact parts 19a and 19b, and especially the one which is on the inside wall 11b side, can be provided so as to be movable back and forth longitudinally (or sideways in FIG. 2) through slots or the like formed into the direction of the guide bar 2. In the structure of FIG. 2, the contact part 19b is movable sideways in the slot when the bolts are loosened. This movable structure is advantageous since it is applicable to various thickness of the guide bar 2 depending on the type of saw chain. Achieving the proper grinding state is related to the inclination of the grindstone shaft 9 and the height of the disk-shape grindstone 10 above the base body 8, and this relation will now be described below.

More specifically, both side blades 7a and upper blade 7b have a cutting angle of 55 to 60°; and accordingly, grinding is performed at an angle close to this angle. FIG. 11 shows a case in which grinding is performed on the side blade 7a of a right cutter 4. In this case, the cutting angle of the side blade 7a may be an angle θ of 55 to 60°, which is the angle of intersection of a tangent at which the peripheral end portion 10c of the disk-shape grindstone 10 is in contact with the cutter 4 and a line parallel to the guide bar 2. To realize this, the radius R of the disk-shape grindstone 10 and the offset S of the grindstone shaft 9 from the channel 11 are obtained. Concretely, this is $S=R \sin(90-\theta)=R \cos\theta$, and the radius R of the disk-shape grindstone 10 and the offset S are determined based upon this relation.

FIG. 10 shows a case in which grinding is performed for the upper blade 7b of the right cutter 4. The cutting angle of the upper blade 7b may be an angle γ of 55 to 60°, which is the angle of intersection of the inclined portion 10b of the disk-shape grindstone 10 and a line parallel to the guide bar 2. This angle γ includes the inclination angle γ of the grindstone shaft 9. Since the side blade 7a is circular in side view, the peripheral end portion 10c that acts thereon has a circular cross section that follows this curvature. Meanwhile, though the upper blade 7b has a straight blade face, since the length of the straight line is shorter than the radius R of the inclined portion 10b that acts on this blade face, the upper blade is deemed to have a substantially straight shape. In view of the above, abrasive particles can be bonded to the grindstone only for the area which acts on the side blade 7a and the upper blade 7b.

In grinding, when the base body 8 is fitted on the guide bar 2, the peripheral end portion 10c of the cup-shape grindstone 10 is lowered down between the depth gauge 6 and the cutting blade 7 (the cutout 12 has a depth and length that avoid interference with the peripheral end portion 10c of the grindstone); and when the channel 11 comes into contact with the top of the saw chain 1, the base body 8 is pushed in the reverse-traveling direction so that the peripheral end portion 10c comes into contact with the side blade 7a and the upper blade 7b. At this point, since the center of gravity of the base body 8 is further to the inside than the inside wall 11b of the channel 11, the contact parts 19a and 19b provided on the lower ends of the outside wall 11a and the inside wall 11b are in contact with the two faces of the guide bar 2, keeping the base body 8 in the horizontal orientation and allowing the disk-shape grindstone 10 to be set in the proper grinding state with respect to the cutting blades 7. During this insertion, by tilting the base body 8, the difference in the lengths of the outside wall 11a and the inside wall 11b allows the opening of the channel to be widened, so that the insertion can be done easily even though the spacing between the contact parts 19a and 19b is the same as the thickness of the guide bar 2. Next, the base body 8 is pushed to the cutting blade 7 side and the grindstone shaft 9 is rotated, so that the side blade 7a and the upper blade 7b are ground at the same time. At this time, the drive links 3 are pressed against the wall face of the groove 2a by the grinding resistance of the disk-shape grindstone 10, and this also helps to maintain the horizontal orientation of the base body 8. Accordingly, during the grinding there is no need to pull the saw chain 1 toward the disk-shape grindstone 10 (which would be dangerous) or to hold down the base body 8 from above.

Manner of rotating the grindstone shaft 9 is optional, and the rotation can be either manual or mechanical. If it is rotated manually, a handle or the like (not shown) can be attached to the grindstone shaft 9 for the rotation; and if it is rotated mechanically, an electric driver 15 shown, for instance, in FIG. 10 can be connected to the grindstone shaft 9 for forced rotation. A driver 15 such as this is commercially available, and one of those can be used. In this case, however, it needs to be make sure that the rotation direction of the grindstone shaft 9 be such that the grindstone acts from the opposite side from the blade tip of the cutting blade so that the grindstone does not tend to bite. To this end, the driver 15 needs to be of reversible rotation, and it also needs to be capable of low-speed rotation so as not to burn the cutting blade 7. It has been confirmed that if the disk-shape grindstone 10 has an outside diameter of 90 mm, then the suitable rotational speed of the driver 15 is from 300 to 600 rpm.

Once one of the left- and right-hand cutting blade 7 has been ground in this manner, then the base body 8 is lifted up and moved to the next cutting blade 7, skipping one cutting blade 7, and the next blade is ground. Once all of the left- or right-hand cutting blades 7 have been ground in this manner all the way around, then the left and right sides of the channel 11 are switched, and the cutting blades 7 on the other side are ground. Since the cup-shape grindstone 10 is rotating, a cover (not shown) can be provided for safety. However, the grindstone shaft 9 needs to stick out from the cover, and it is appropriate to have a window through which the site being ground can be viewed in order to check on the grinding state. Furthermore, the grinder of the present invention can also grind the depth gauge 6 so as to meet the cases that the height of the cutting blades 7 has been reduced by grinding.

Figure 12:
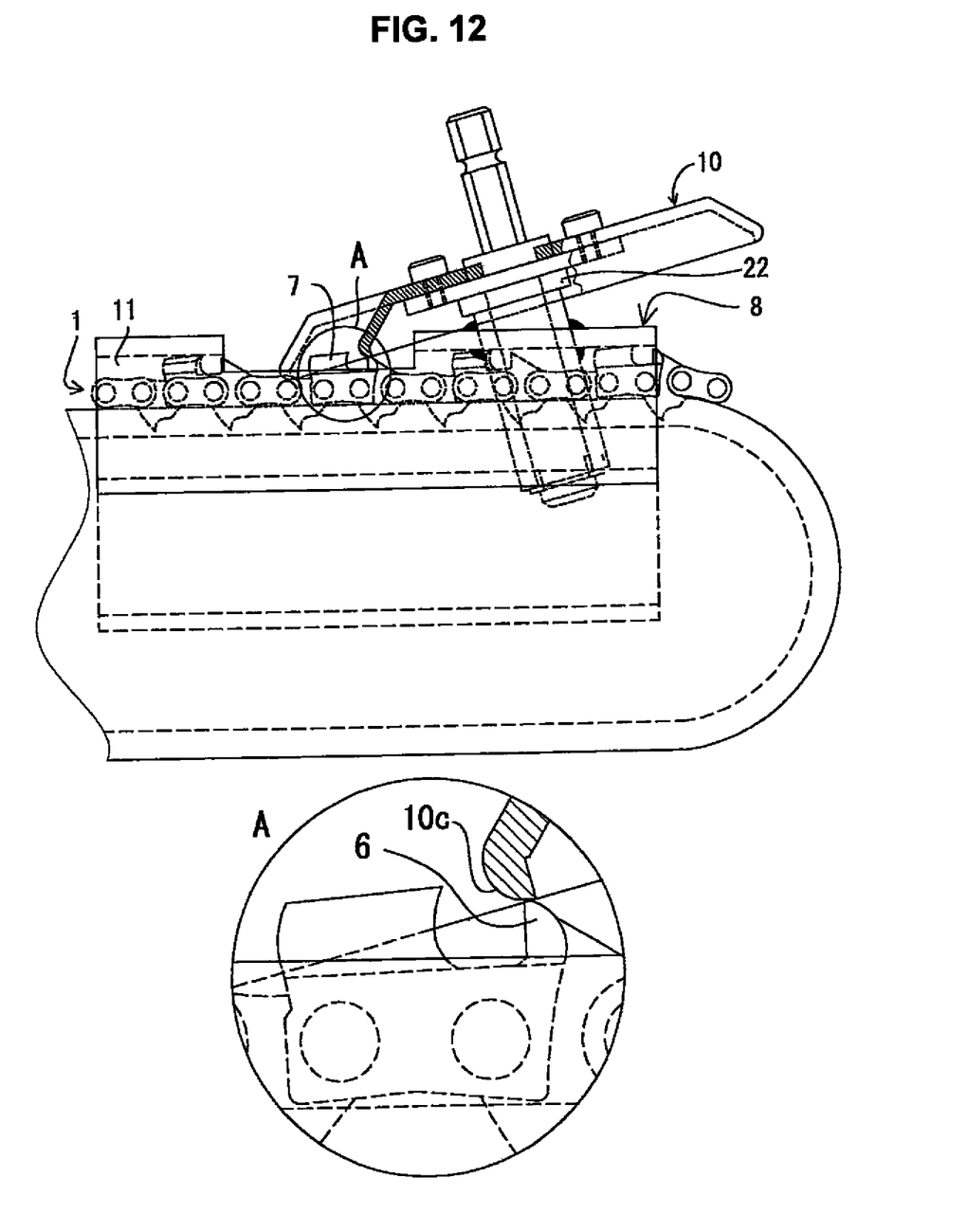
FIG. 12 provides partially cut-away side views of the grinder, showing the grinding state.

FIG. 12 is a partially cut-away side view of this. In this case, the bottom face at the top of the peripheral end portion 10c of the disk-shape grindstone 10 is used (with the bottom face set substantially flat), and therefore a spacer is set at the top of the channel 11 to bring the base body 8 to a specified height. Also, a collar can be fitted over the grindstone shaft 9 to increase the height of the bottom face of the top of the peripheral end portion 10c of the disk-shape grindstone 10.

Figure 3:
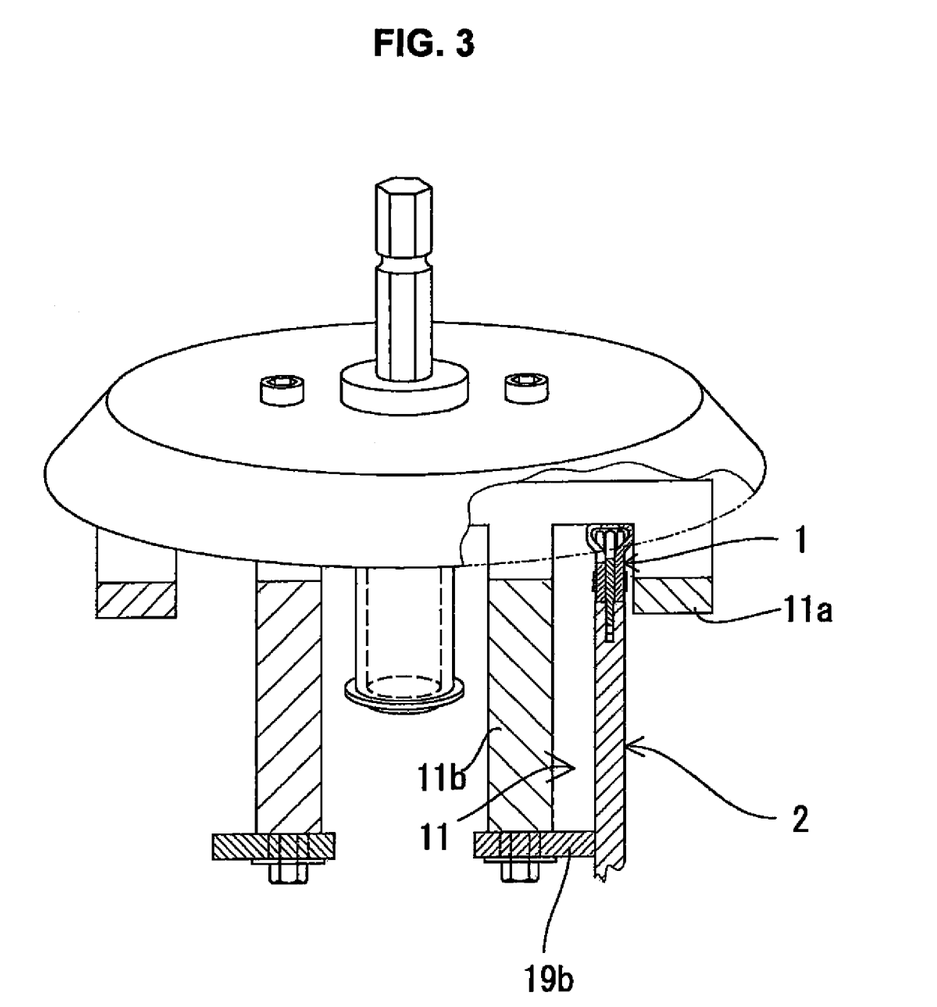
FIG. 3 is a cross sectional view taken along the imaginary line A-A of another example.

FIG. 3 is a cross sectional view taken along the imaginary line A-A of FIG. 1, illustrating another example of the present invention. In this example, the saw chain 1 is received directly by the inside wall face of the outside wall 11a. Here again, the base body 8 is set in a horizontal orientation due to the momentum of the base body 8 as discussed above, and the advantages of this structure is that the length of the outside wall 11a can be further shortened, and there is no need for the contact part 19a.

Figure 4:
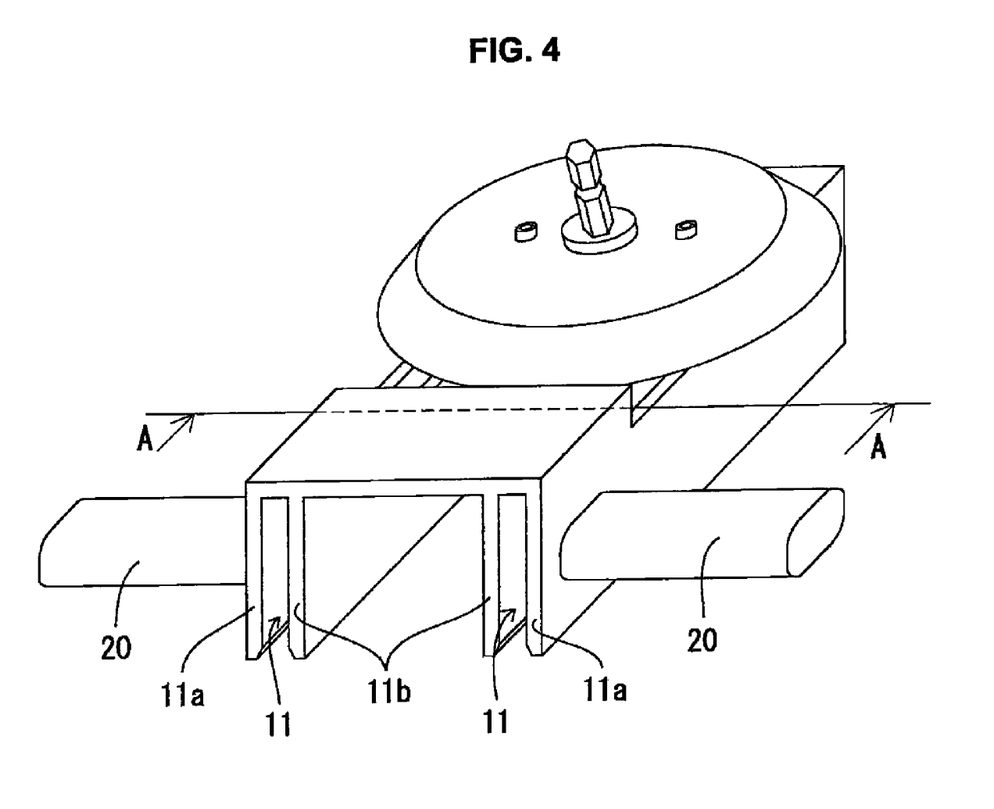
FIG. 4 is a perspective view of a grinder of another example.
Figure 5:
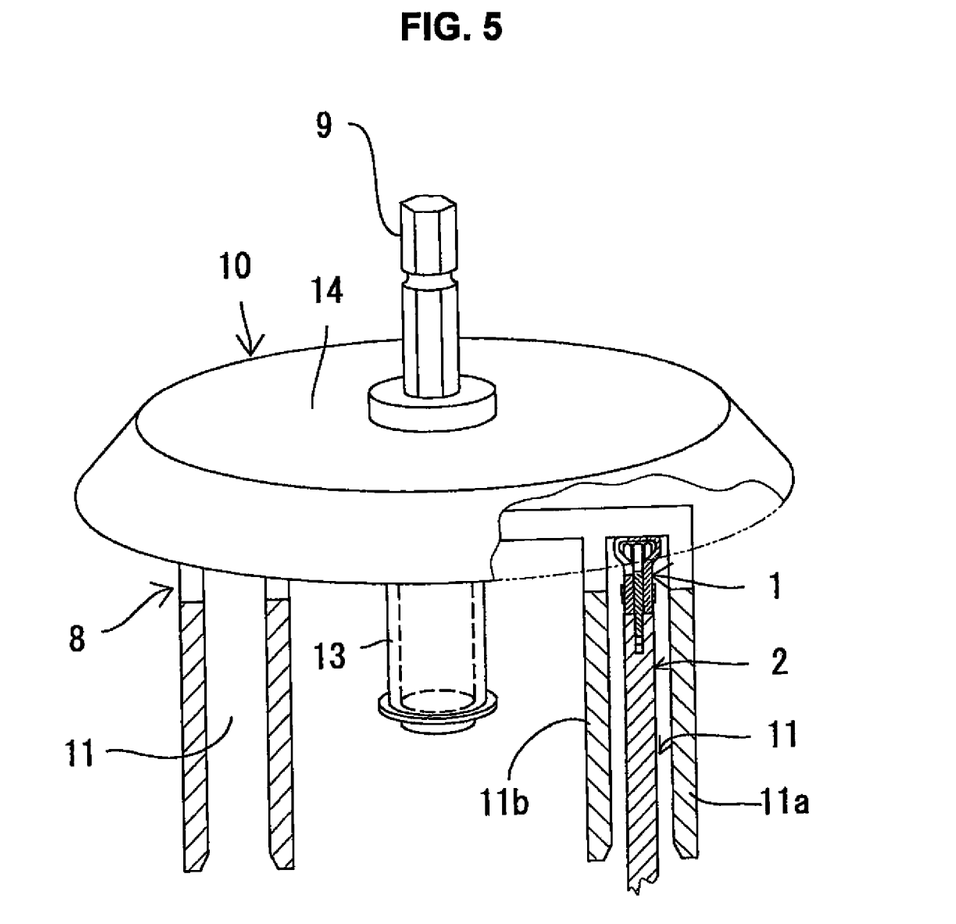
FIG. 5 is a cross sectional view taken along the line A-A in FIG. 4.

FIG. 4 is a perspective view of a grinder of yet another example of the present invention, and FIG. 5 is a cross sectional view taken along the line A-A in FIG. 4. In this example, the outside wall 11a and inside wall 11b of the channel 11 are set to have substantially the same length, and their width is formed greater than the thickness of the guide bar 2. Advantages to this structure are that the insertion of the guide bar 2 is easier, and production of the grinder is simplified. However, since it is difficult to maintain the horizontal orientation of the base body 8, handles 20 are attached to the base body 8, and these handles are used to maintain the horizontal orientation. These handles 20 can also be used when the base body 8 is pressed against the cutting blade 7 during, grinding.

Figure 6:
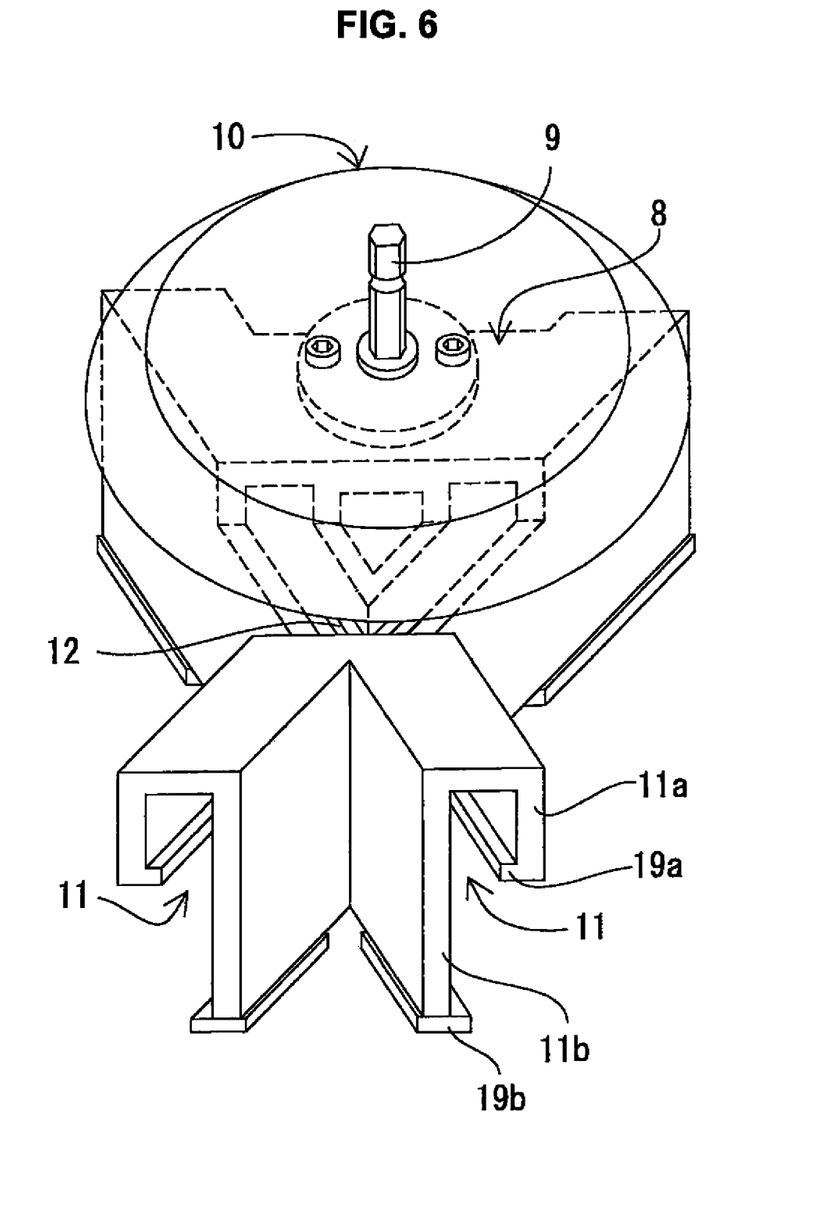
FIG. 6 is a perspective view of a grinder of another example.

FIG. 6 is also a perspective view of another example. This example is the same as the one in FIG. 1 except that the channels 11 are crossed to form an X shape. The advantage of this structure is that the center of gravity of the base body 8 is closer to the channels 11, and thus there is less tipping moment.

Figure 7:
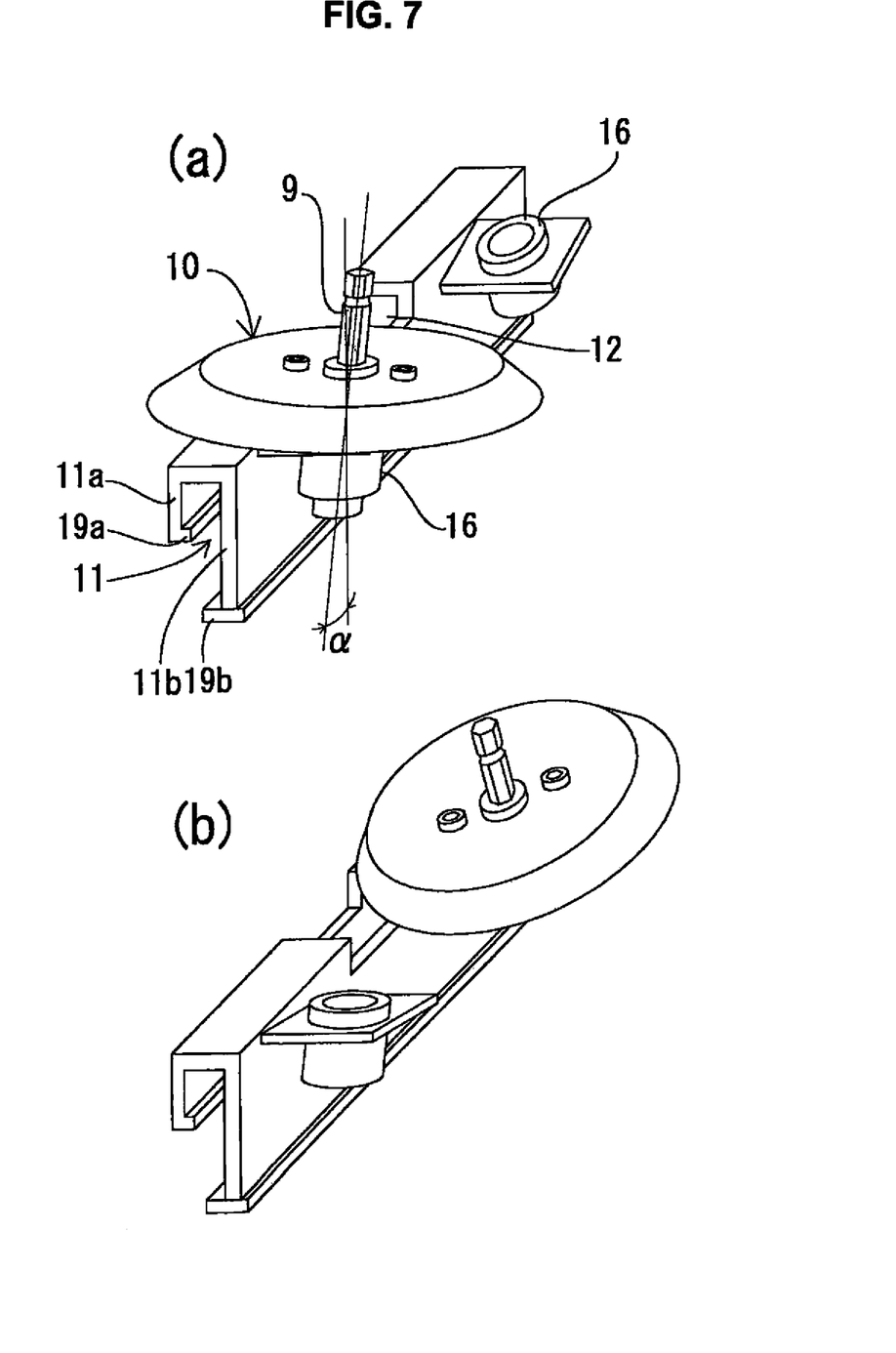
FIG. 7 provides perspective views of a grinder of another example.

FIGS. 7(*a*) and 7(*b*) are also perspective views of another example. In this example, one channel 11 is provided at a specific distance away from the grindstone shaft 9, two shaft receiving parts 16 inclined at the inclination angle γ for the left and right cutters 4 are respectively provided on the side faces on the inside wall 11*b* side, so that the grindstone shaft 9 can be interchangeably attached therein when grinding the left or right cutter 4. In this case, if the shaft receiving parts 16 are lengthened for a certain amount, the grindstone shaft 9 can just be pushed into the shaft receiving part from above, making its reattachment easier. An advantage of this structure is that only one channel 11 is needed, and the overall size can be more compact.

Figure 8:
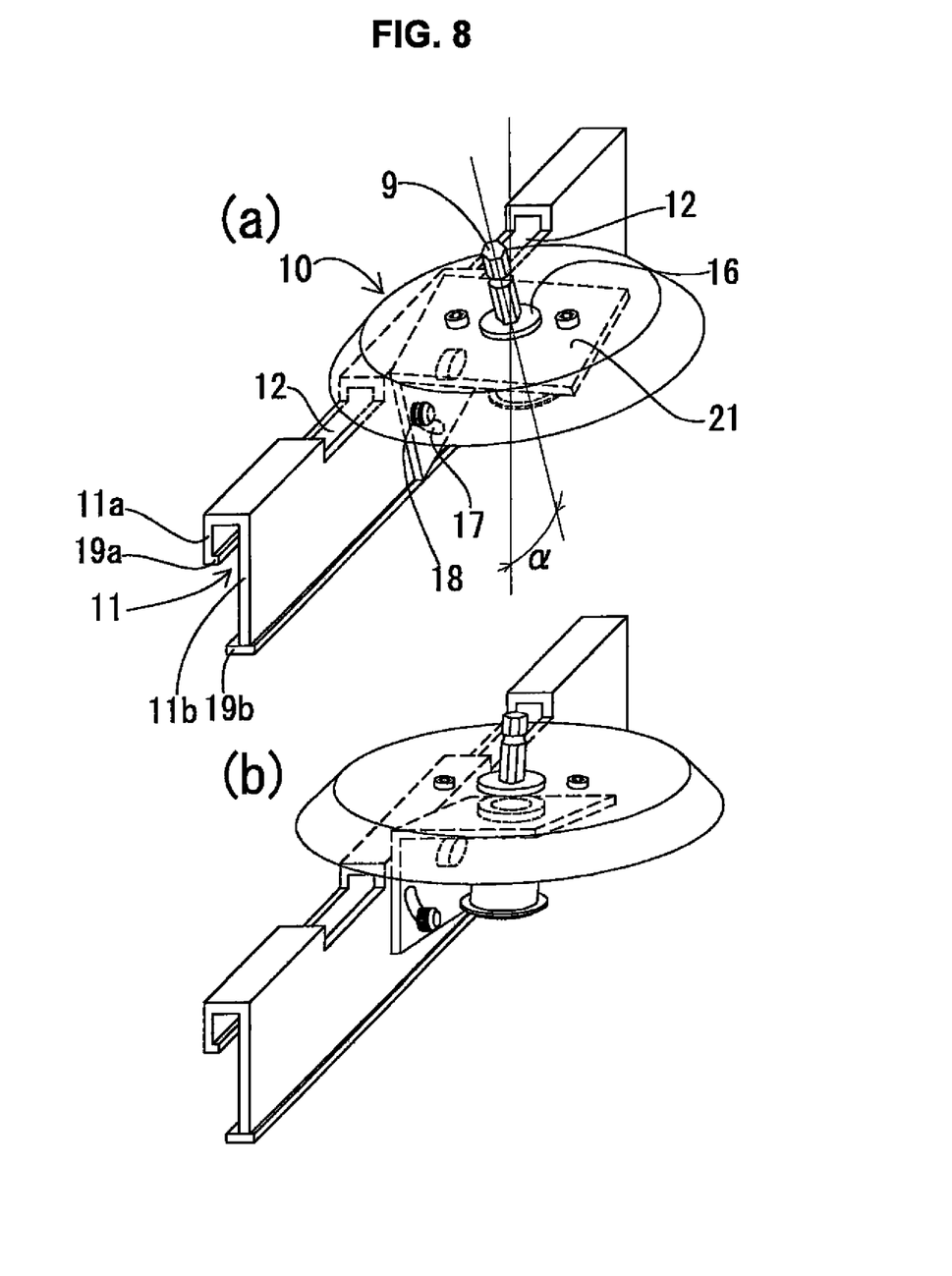
FIG. 8 provides perspective views of a grinder of still another example.

FIGS. 8(*a*) and 8(*b*) are also perspective views illustrating another example. In this example, the shaft receiving part 16 is provided so as to be inclined according to the inclination angle α. More specifically, the shaft receiving part 16 is provided in an L-shaped attachment plate 21, a slot 17 is formed in this attachment plate 21 for a rotational range that corresponds to the inclination angle α, and a bolt 18 is passed through this slot and tightened. An advantage of this structure is that there is no need to reattach the grindstone. In this case, two of the cut-outs 12 must be provided in the longitudinal direction.

Figure 9:
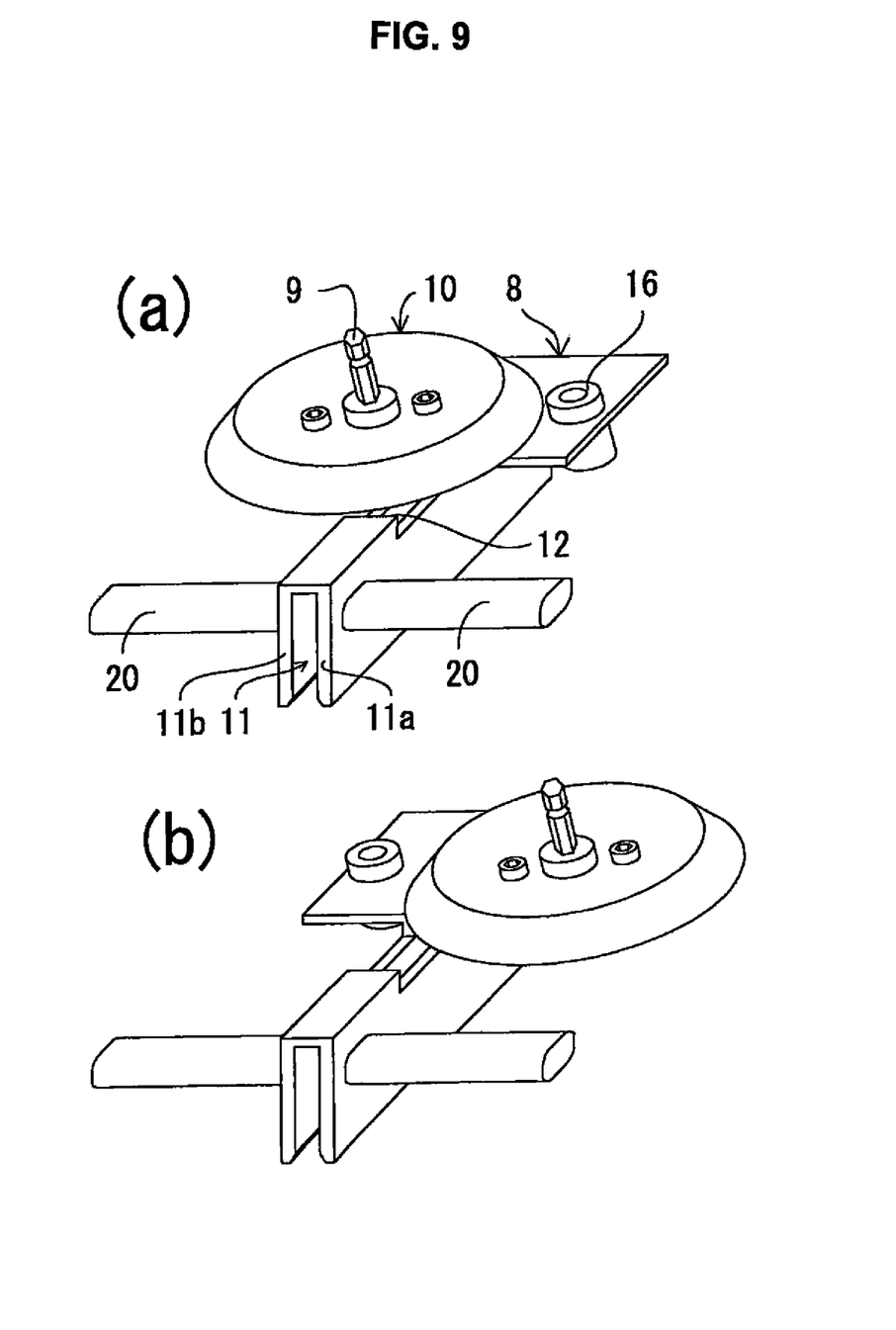
FIG. 9 provides perspective views of a grinder of yet another example.

FIGS. 9(*a*) and 9(*b*) are perspective views illustrating another example. In this example, only one channel 11 is provided in the center of the base body 8, the base body 8 extends from both sides of the channel 11, and the shaft receiving parts 16 are provided on this base body so as to receive the grindstone shaft 9 rotatably and removably. The grindstone shaft 9 is interchanged to grind the cutters 4 on the left or right. This example is applied to a grinder in which the channel 11 has an increased width and the posture orientation of the grinder is controlled by the handles 20.

The invention claimed is:

1. A grinder for a saw chain, comprising a base body provided with two channels which are interchangeably, depending on a left or right blade of a saw, fitted on a guide bar of the saw from above, and a grindstone shaft provided in the base body at a specific angle of inclination in a direction parallel to the channels and spaced equidistantly from the channels, so that side blades and upper blades of the saw chain are ground simultaneously by a disk-shape grindstone attached to the grindstone shaft, characterized in that outside walls of the channels are formed shorter than the inside walls, and contact parts that come into contact with the guide bar are formed at lower ends of both walls so that the base body is set horizontally.

2. The grinder for a saw chain according to claim 1, wherein the outside walls receive the saw chain with wall faces thereof.

3. The grinder for a saw chain according to claim 1 or 2, wherein two channels are provided crossing in an X shape, and the grindstone shaft is provided in the middle thereof.

4. The grinder for a saw chain according to claim 1 or 2, wherein one channel is provided at a specific distance away from the grindstone shaft, two shaft receiving parts for receiving grindstone shafts at mutually opposite inclination angles are provided on a side face of the channel which is on a grindstone shaft-side, and the grindstone shaft is provided interchangeably on the shaft receiving parts.

* * * * *